United States Patent [19]

Matsumoto

[11] Patent Number: 5,513,876
[45] Date of Patent: May 7, 1996

[54] AIRBAG RESTRAINT UNIT

[75] Inventor: Yuji Matsumoto, Ayase, Japan

[73] Assignee: Ikeda Bussan Co., Ltd., Ayase, Japan

[21] Appl. No.: 390,046

[22] Filed: Feb. 17, 1995

[30] Foreign Application Priority Data

Feb. 18, 1994 [JP] Japan .................................. 6-044908

[51] Int. Cl.⁶ .................................................. B60R 21/16
[52] U.S. Cl. .................................. 280/728.1; 280/728.2; 280/732
[58] Field of Search .................... 280/728.2, 743.1, 280/732, 728.1

[56] References Cited

U.S. PATENT DOCUMENTS

| | | | |
|---|---|---|---|
| 5,195,775 | 3/1993 | Komerska et al. | 280/732 |
| 5,221,108 | 6/1993 | Hirabayashi | 280/728 |
| 5,326,131 | 7/1994 | Yokota et al. | 280/728 A |
| 5,364,124 | 11/1994 | Donegan et al. | 280/732 X |

FOREIGN PATENT DOCUMENTS

| | | | |
|---|---|---|---|
| 2335373 | 7/1977 | France | 280/732 |
| 50-131742 | 10/1975 | Japan . | |
| 56-43890 | 10/1981 | Japan . | |
| 61-185642 | 11/1986 | Japan . | |
| 2-38360 | 3/1990 | Japan . | |
| 4-143142 | 5/1992 | Japan . | |
| 5-262195 | 10/1993 | Japan . | |

*Primary Examiner*—Margaret A. Focarino
*Assistant Examiner*—Christopher Ellis
*Attorney, Agent, or Firm*—Foley & Lardner

[57] ABSTRACT

An airbag restraint trait forming part of an airbag restraint system mounted on an automotive vehicle. The airbag restraint unit comprises a storage container having an upper section defining a gas ejection opening. A gas generator is disposed inside the storage container. An airbag is fastened to the upper section of the storage container so that gas from the gas generator flows through the gas ejection opening into the airbag when the gas generator is operated. Additionally, a support sheet is disposed between the gas generator and the airbag to support the airbag in a folded state. The support sheet is fastened at its end sections to the storage container and adapted to break under the action of high temperature and pressure gas from the gas generator.

7 Claims, 4 Drawing Sheets 5,513,876

AIRBAG RESTRAINT UNIT

BACKGROUND OF THE INVENTION

1. Field of the Invention

This invention relates to improvements in an airbag restraint unit of an airbag restraint system, and more particularly to such an airbag restraint unit of the type wherein an airbag is disposed above a gas generator, which is located inside a storage container having an gas ejection opening, so that gas from the gas generator is supplied through the gas ejection opening into the airbag.

2. Description of the Prior Art

Hitherto a variety of airbag restraint units have been known as devices for protecting passengers in a vehicle or the like. Such airbag restraint units are disclosed, for example, Japanese Utility Model Provisional Publication No. 2-38360, Japanese Patent Publication No. 56-43890 and Japanese Utility Model Provisional Publication No. 61-185642. The airbag restraint unit is disposed in a passenger compartment of the vehicle, or the like, and forms part of an airbag restraint system for protecting the vehicle passenger from coming into direct contact with a steering wheel or a windshield.

Additionally, Japanese Utility Model Publication No. 50-131742, Japanese Patent Provisional Publication No. 4-143142, and Japanese Patent Provisional Publication No. 5-262195 disclose an airbag cover which covers and stores thereinside an airbag in a folded state, and forms part of the airbag restraint unit.

Further, an airbag restraint unit 1 as shown in FIGS. 4, 5A and 5B has been known and arranged to be disposed inside an instrument panel 2 of a vehicle in a manner that the upper portion of the unit 1 is located near the inner surface of the instrument panel 1. This airbag restraint unit 1 is fixed to a support arm 4 mounted on a steering member 3. The airbag restraint unit 1 includes a cylindrical gas generator 5 which is stored in a storage container 6, which is secured to the support arm 4. The storage container 6 includes an base lower section 6a and a base upper section 6b. The base lower section 6a is opened at its upper section and has a generally U-shaped cross-section. The base upper section 6b is installed to the upper end portion of the opened upper section and formed with gas ejection openings 6c through which high pressure gas from the gas generator 5 flows upwardly when the gas generator 5 is operated. The gas generator 5 has a bolt section 5a protruding from an end face thereof. The bolt section 5a fits in an opening formed at an end wall of the base lower section 6a, and is fixed in position upon engagement with a nut so that the gas generator 5 is fixedly secured to the base lower section 6a.

An airbag 7 is fixed to the upper end face of the base upper section 6b in such a manner that a gas supply opening 7a of the airbag is communicated with the gas ejection openings 6c of the base upper section 6b. Additionally, an airbag cover 8 is fixed to the storage container 6 so as to cover the airbag 7 in the folded state.

At a vehicle collision or the like, high pressure gas from the gas generator 5 flows through the gas ejection openings 6c of the base upper section 6b and the gas supply opening 7a of the airbag 7 and is supplied into the airbag 7. As a result, the airbag 7 inflates and then opens or breaks the airbag cover 8 so as to project toward the vehicle passenger thereby protecting the vehicle passenger from coming into direct contact with inside parts (such as a steering wheel and a windshield) within the passenger compartment.

However, drawbacks have been encountered in the above-discussed conventional airbag restraint unit as shown in FIGS. 4, 5A and 5B. That is, the storage container 6 of the airbag restraint unit 1 includes the base lower and upper sections 6a, 6b, and therefore is relatively heavy in weight and high in production cost.

In view of this, it has been proposed to omit the base upper section 6b so that the airbag 7 is secured at its part defining the gas supply opening 7a to the upper end portion of the opened upper section of the base lower 6a as shown in FIGS. 6A and 6B. However, in this case, there is the possibility that the folded and stored state of the airbag 7 is unavoidably released or broken when or after the airbag 7 is stored in the base lower section 6a, since the airbag 7 is pressed into a position above the gas generator 5 under its folded and stored state.

However, even such an airbag restraint unit of FIGS. 6A and 6B has the following difficulties: If the folded and stored state of the airbag 7 is released, there is a fear that the airbag 7 cannot smoothly inflate. Additionally, an assembly operation must be made maintaining the folded and stored state of the airbag 7 during assembly of the airbag restraint unit 1, and therefore there is a fear of an operational efficiency being lowered. Further in both cases that the base upper section 6b is used and not used, high pressure and temperature gas comes into direct contact with sewing threads of the airbag 7 to provide the possibility of the sewing threads of the airbag 7 being broken. As a result, it may affect a restraining performance of the airbag 7 for a vehicle passenger.

SUMMARY OF THE INVENTION

It is an object of the present invention to provide an improved airbag restraint unit which can overcome drawbacks encountered in conventional similar airbag restraint units.

Another object of the present invention is to provide an improved airbag restraint unit which is high in a restraining performance to a vehicle passenger and excellent from the economical view points.

A further object of the present invention is to provide an improved airbag restraint unit which can effectively reduce the weight of a storage container for a gas generator and lower a production cost of the airbag restraint unit, while effectively protecting an airbag from being damaged.

A still further object of the present invention is to provide an improved airbag restraint unit by which an assembly operation of the airbag restraint unit can be easily and smoothly accomplished thereby improving the operational efficiency in an assembly process.

A stil further object of the present invention is to provide an improved airbag restraint unit by which an airbag can be assembled in its folded and stored state at the upper section of a storage container without allowing the folded and stored state to be released even after assembly of the airbag restraint system.

A still further object of the present invention is to provide an improved airbag restraint unit in which high temperature and pressure gas from the gas generator can be effectively prevented from directly contacting with an airbag and sewing threads of the airbag when the gas generator is operated, thereby effectively protecting the airbag and the sewing threads from being damaged or broken.

An airbag restraint unit of the present invention comprises a storage container having an upper section defining a gas ejection opening. A gas generator is disposed inside the storage container. An airbag is fastened to the upper section of the storage container so that gas from the gas generator flows through the gas ejection opening into the airbag when the gas generator is operated. Additionally, a support sheet is disposed between the gas generator and the airbag to support the airbag in a folded state.

By virtue of the support sheet, the airbag in its folded state can be prevented from dropping onto the gas generator, even in the case that the storage container is constituted of a single member (such as the base lower section) having a generally U-shaped cross-section so that the storage container is opened at its upper section. Accordingly, the folded and stored state of the airbag can be prevented from releasing or breaking even when and after the airbag is stored in the storage container. This largely facilitates and smoothens an assembly operation for the airbag restraint unit thus improving an operational efficiency during production of the airbag restraint unit.

Additionally, when the gas generator is operated, the support sheet located between the gas generator and the airbag is broken under high temperature and pressure gas from the gas generator. This broken support sheet is blown up under a gas pressure to cover the airbag and sewing threads of the airbag, thereby preventing the high temperature and pressure gas from coming into direct contact with the airbag and the sewing threads. As a result, the airbag can be effectively protected from being damaged or broken, thus improving a restraining performance to a vehicle passenger and a reliability of the airbag restraint unit.

Optionally, the airbag restraint unit of the present invention is arranged as follows: The storage container is formed with first and second openings which are formed at first and second end walls which are opposite to each other, in which the gas generator has a bolt section projected from an end of the gas generator. The gas generator is inserted through the first opening into the storage container and put into a position where the bolt section is inserted in the second opening to be fixed to the second end wall with a nut. Furthermore, the airbag restraint unit is provided with a retainer through which the airbag is fastened at its end peripheral portion to the upper section of the storage container, in which the support sheet has end sections fastened to the upper section of the storage container together with the end peripheral portion of the airbag through the retainer.

With the above optional arrangement, an insertion operation of the gas generator into the storage container can be easily and stably made while facilitating a fixing operation of the gas generator to the storage container, thereby largely improving an assembly operation of the airbag restraint unit. Additionally, the assembly operation can be made in a condition where the airbag is kept in its folded and stored state, thus improving the operational efficiency during production. Further, by virtue of the retainer, the support sheet is fastened together with the airbag to the storage container through the retainer, thereby improving the operational efficiency during assembly of the airbag restraint unit while reducing the number of constituting parts of the airbag restraint unit. This largely improves the airbag restraint unit from the economical view points.

DETAILED DESCRIPTION OF THE INVENTION

Figure 1:
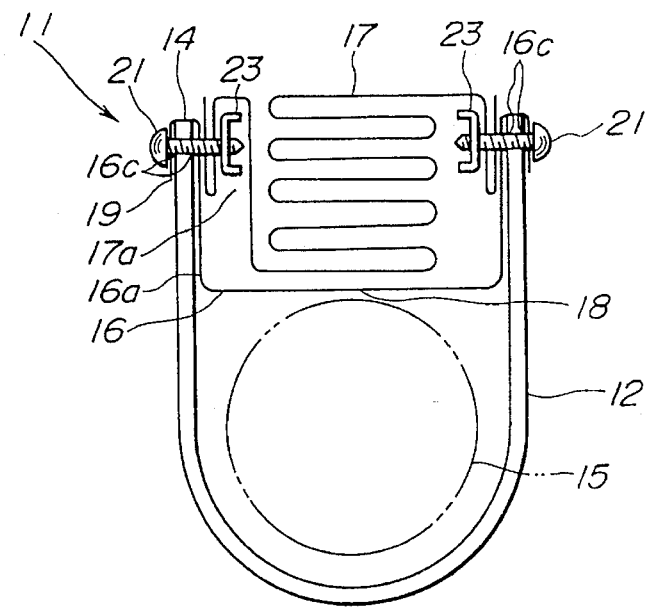
FIG. 1 is a schematic vertical sectional view of an embodiment of an airbag restraint unit of the present invention.
Figure 2:
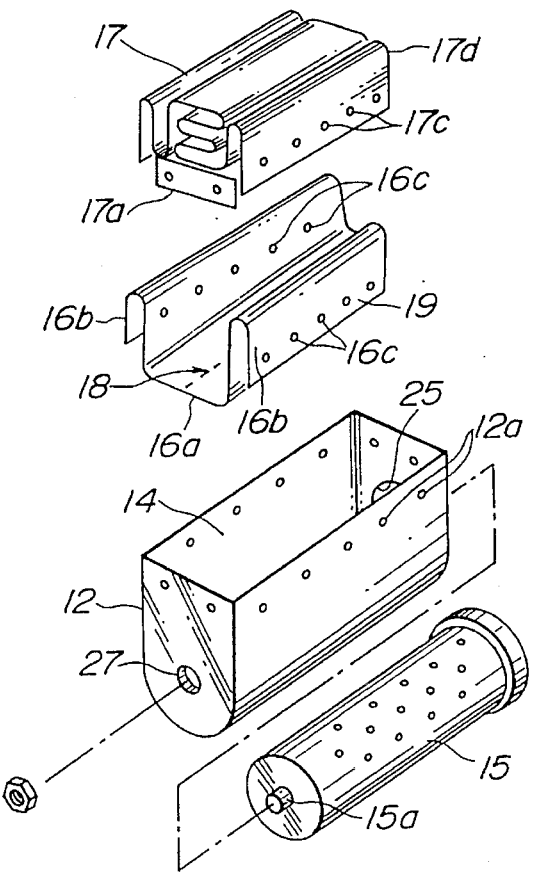
FIG. 2 is a schematic exploded perspective view of the airbag restraint unit of FIG. 1.
Figure 3:
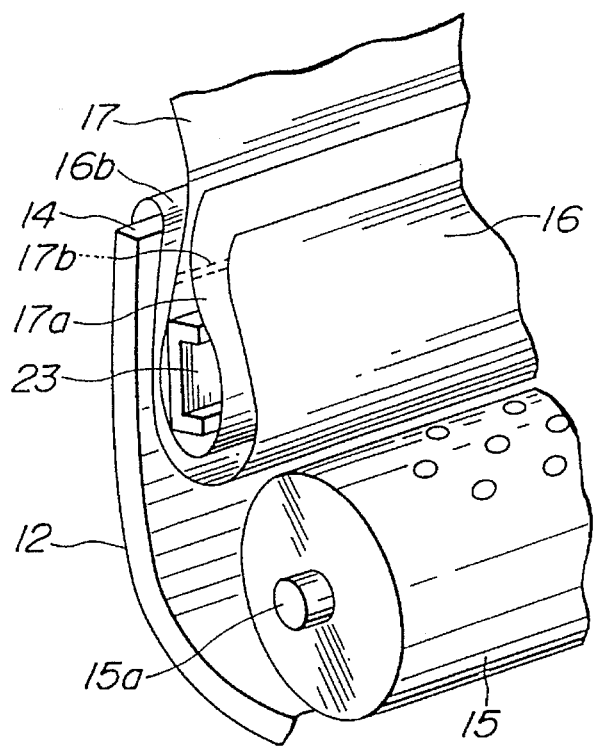
FIG. 3 is a fragmentary schematic perspective view of the airbag restraint unit of FIG. 1.
Figure 4:
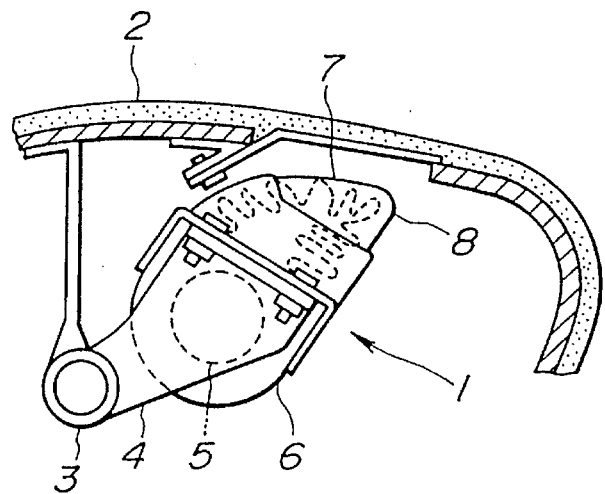
FIG. 4 is a schematic vertical sectional view of a conventional airbag restraint unit.
Figure 5A:
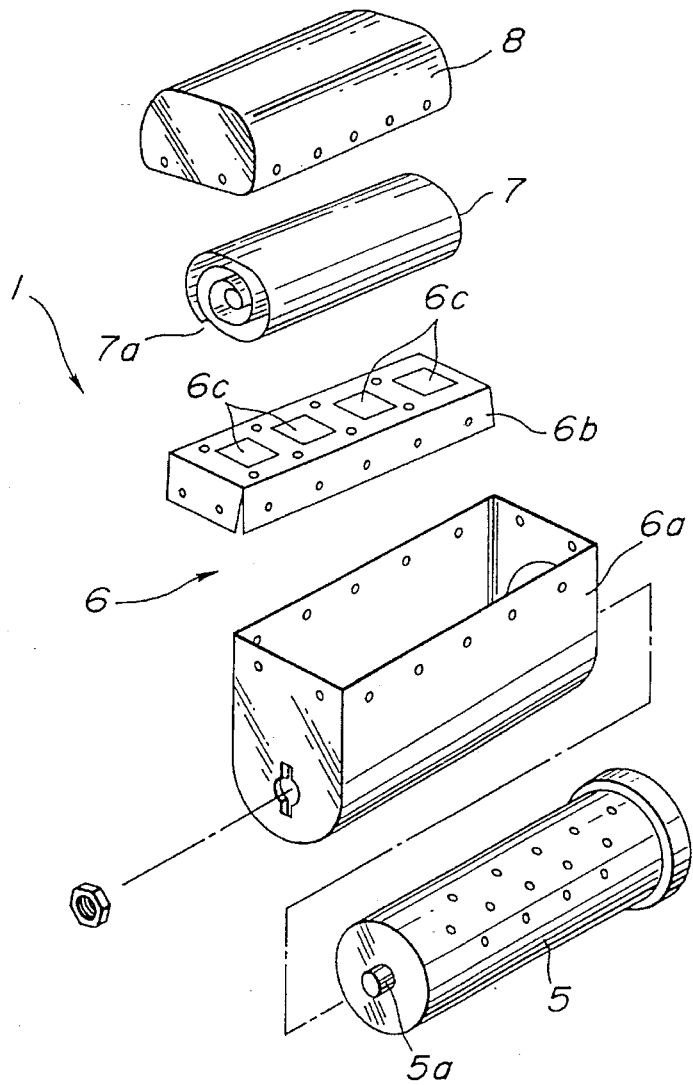
FIG. 5A is a schematic exploded perspective view of the conventional airbag restraint unit of FIG. 4.
Figure 5B:
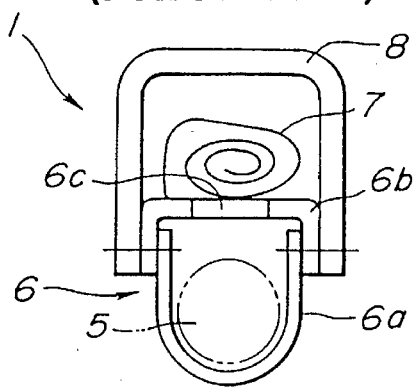
FIG. 5B is a schematic vertical sectional view of the conventional airbag restraint unit of FIG. 4.
Figure 6A:
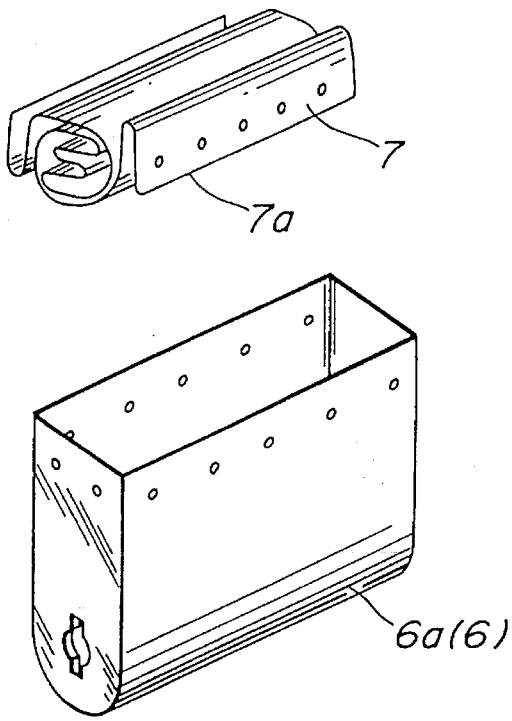
FIG. 6A is a schematic exploded perspective view of another conventional airbag restraint unit.
Figure 6B:
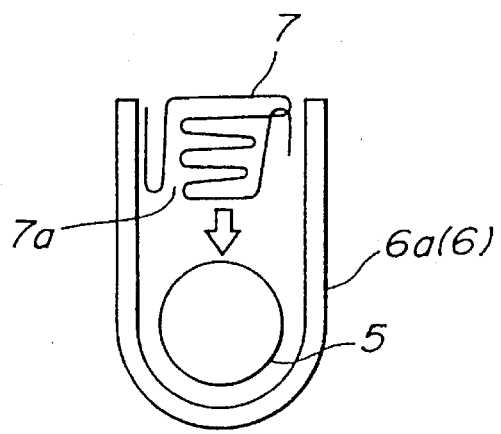
FIG. 6B is a schematic vertical sectional view of the conventional airbag restraint unit of FIG. 6A.

Referring now to FIGS. 1 to 3, an embodiment of an airbag restraint unit according to the present invention is illustrated by the reference numeral 11. The airbag restraint unit 11 in this embodiment forms part of an airbag restraint system for protecting a vehicle driver or a vehicle passenger from coming into direct contact with a steering wheel (not shown) and/or a windshield (not shown) of an automotive vehicle during a vehicle collision or the like. The airbag restraint unit 11 is disposed inside a passenger compartment of the automotive vehicle, though not shown, and more specifically, inside an instrument panel (not shown) of the vehicle in a manner that the upper portion of the unit 11 is located near the inner surface of the instrument panel. This airbag restraint unit 1 is, for example, fixed to a support arm (not shown) mounted on a steering member (not shown) in a known manner.

The airbag restraint unit 11 includes a cylindrical gas generator 15, which is stored in a storage container 12 that is secured to the support arm. The storage container 12 is formed open at its upper section and has a generally U-shaped cross-section. The opened upper section of the storage container 12 defines a gas ejection opening 14 through which high pressure gas from the gas generator 15 flows upwardly when the gas generator 15 is operated. The gas generator 15 has a bolt section 15a protruding from an end thereof. The bolt section 15a fits in a bolt insertion hole 27 formed at an end wall of the storage container 12 and fixed in position upon engagement with a nut (not numeral) so that the gas generator 15 is fixedly secured to the storage container 12.

An airbag 17 is sealingly fixed to the storage container 12 in a manner that the gas from the gas generator 15 flows through the gas ejection opening 14, of the storage container and is supplied into the airbag 17. More specifically, the airbag 17 has a lower peripheral edge portion 17a defining a gas supply opening through which the gas from the gas generator 15 is introduced into the airbag 17. The lower peripheral edge portion 17a is fixedly and sealingly secured to the upper section of the storage container 12 in a manner that the gas supply opening of the airbag 17 is communicated with the gas ejection opening 14 of the storage container 12 maintaining a gas tight seal between them.

A support sheet 16 is disposed between the gas generator 15 and the airbag 17 in order to support the airbag 17 in a folded state. The support sheet 16 is formed of a resilient or soft sheet such as a plastic (synthetic resin) sheet or film, a non-woven fabric, a woven fabric, or the like. It will be understood that the support sheet 16 is not limited to such a resilient sheet and therefore may be formed of a thin plastic molded product.

The support sheet 16 is generally rectangular and includes a central section 16a which is formed with slits 18 which are arranged in the longitudinal direction of the storage container 12. The central section 16a is bent to have a generally U-shaped cross-section. The support sheet 16 further includes opposite end sections 16b, 16b which are integral with the opposite end portions of the central section 16a and serve as installation sections 19, 19. Each installation section 19 is formed with a plurality of openings 16c for small screws 21. While the support sheet 16 of the single sheet type has been shown and described as being used in this embodiment, it will be understood that the support sheet 16 may be constituted of a plurality of band-like sheets which are disposed spaced from each other.

The storage container 12 is formed with a plurality of openings 12a (for small screws 21) which are located at its upper peripheral section near the gas ejection opening 14. These openings 12a coincide respectively with the openings 16c of the installation section 19 of the support sheet 16, in which each small screw 21 is inserted through the corresponding openings 12a, 16c to fasten the storage container 12 and the support sheet 18. As shown, each installation section 19 is located on the outer surface of the wall of the storage container 12. Additionally, the whole lower peripheral edge portion 17a is fastened to the inner peripheral surface of the upper peripheral section of the storage container 12 through a retainer 23. The lower peripheral edge portion 17a is formed bag-like under sewing thereby to form a sewing portion 17a. It will be understood that the lower peripheral edge portion 7a may be sheet-like without being formed bag-like. Thus, the central section 16a of the support sheet 16 is located between the inner surface of the storage container 12 and the central section 16a of the support sheet 16.

In this embodiment, the airbag 17 is formed at its lower peripheral edge portion 17a with a plurality of openings 17c for small screws 21. The openings 17c coincide respectively with the openings 16c of the support sheet 16 and also respectively with the openings 12a of the storage container 12. Each small screw 21 is passed through each opening 12a, each opening 16c and each opening 17c and screwed into the retainer 23, so that the airbag 17 and the support sheet 16 are fastened to the storage container 12 through the retainer 23 by the small screws 21.

In an assembly process of the airbag restraint unit 11, after the opposite end sections 16b of the support sheet 16 are fastened to the upper peripheral section of the storage container 12 together with the airbag 17 by using the small screws 21, the gas generator 15 is inserted into the storage container 12 through an opening 25 formed at an end wall of the storage container 12. Then, the bolt section 15a formed at the end of the gas generator 15 is inserted through a bolt insertion hole 27 formed at the opposite end wall of the storage container 12. The nut is engaged on the bolt section 15a and tightened to fix the gas generator 15 in position.

The airbag 7 may be folded to obtain its folded state after assembling the airbag 17, the support sheet 16 and the storage container 12 under a condition that the airbag 17 is put between the retainer 23 and the storage container 12.

It will be appreciated that the principle of the present invention is not limited to be applied to the structure of the above embodiment, and therefore various parts of the airbag restraint unit 11 may be changed and modified in shape, structure and the like. For example, a variety of modifications in shape, structure and the like may be applied on the gas generator 15, the storage container 12, the retainer 23, the airbag 7 and the like.

What is claimed is:

1. An airbag restraint unit comprising:

a storage container having an upper section defining a gas ejection opening;

a gas generator disposed inside said storage container;

an airbag fastened to the upper section of said storage container so that gas from said gas generator flows through the gas ejection opening into said airbag when said gas generator is operated; and a support sheet disposed between said gas generator and said airbag to support said airbag in a folded state, said support sheet comprising a generally rectangular sheet that includes a central section formed with at least one slit, said at least one slit extending in a longitudinal direction of said storage container, said central section having a generally U-shaped cross-section, said sheet also comprising two opposite end sections which are integral with said central section and arranged so that said central section is between said two opposite end sections, each of said two opposite end sections being fastened to said storage container.

2. An airbag restraint unit as claimed in claim 1, wherein said support sheet is fastened at its two opposite end sections with said storage container to maintain said support sheet above said gas generator.

3. An airbag restraint unit as claimed in claim 1, wherein said storage container includes means defining first and second openings which are formed at first and second end walls which are opposite to each other, wherein said gas generator has a bolt section projected from an end of said gas generator, said gas generator being inserted through said first opening into said storage container and put into a position where said bolt section is inserted in said second opening to be fixed to said second end wall with a nut.

4. An airbag restraint unit as claimed in claim 1, wherein said airbag has an end peripheral portion, and said airbag unit further comprises a retainer through which said airbag is fastened at said end peripheral portion to the upper section of said storage container, wherein said two opposite end sections of said support sheet are fastened to the upper section of said storage container together with the end peripheral portion of said airbag through said retainer.

5. An airbag restraint unit as claimed in claim 1, wherein said support sheet is breakable under an action of gas from said gas generator.

6. An airbag restraint unit as claimed in claim 1, wherein said support sheet is formed of a materiel selected from the group consisting of a film, a non-woven fabric and a woven fabric.

7. An airbag restraint unit as claimed in claim 1, further comprising a plurality of small screws each of which passes through a part of said storage container, a part of said support sheet and a part of said airbag to fasten said support sheet and said airbag to said storage container.

* * * * *